United States Patent [19]
Andoh

[11] Patent Number: 5,241,701
[45] Date of Patent: Aug. 31, 1993

[54] ANTENNA SELECTING DIVERSITY RECEIVING APPARATUS

[75] Inventor: Akira Andoh, Hyogo, Japan

[73] Assignee: Mitsubishi Denki Kabushiki Kaisha, Tokyo, Japan

[21] Appl. No.: 692,225

[22] Filed: Apr. 26, 1991

[30] Foreign Application Priority Data

Aug. 1, 1990 [JP] Japan .................... 2-204457

[51] Int. Cl.$^5$ .................................... H04B 1/06
[52] U.S. Cl. .................... 455/272; 455/277.1; 455/133
[58] Field of Search .............. 455/272, 277.1, 277.2, 455/133, 134, 135, 136; 370/95.3

[56] References Cited

U.S. PATENT DOCUMENTS

| | | | |
|---|---|---|---|
| 4,663,768 | 5/1987 | Ryu | 455/133 |
| 4,696,058 | 9/1987 | Tachita et al. | 455/277 |
| 4,756,023 | 7/1988 | Kojima | 455/277.1 |

FOREIGN PATENT DOCUMENTS

286366 4/1988 European Pat. Off.
318665 9/1988 European Pat. Off.

Primary Examiner—Reinhard J. Eisenzopf
Assistant Examiner—Christine K. Belzer
Attorney, Agent, or Firm—Rothwell, Figg, Ernst & Kurz

[57] ABSTRACT

An antenna selecting diversity receiving apparatus utilizes linear modulation with information about the envelope of a modulating wave included therein and is employed in a radio communication system using TDM. An integrating circuit serves to integrate electric-field levels received by respective antennas over a predetermined period of time before a start in a time slot allotted to a radio receiver. Then, a comparing circuit makes a comparison among respective time-integrated values corresponding to the respective antennas. In addition, a changeover control circuit serves to select an antenna corresponding to the maximum time-integrated value as the antenna used during the period of the time slot allotted to the radio receiver.

9 Claims, 10 Drawing Sheets

/ 5,241,701 /

ANTENNA SELECTING DIVERSITY RECEIVING APPARATUS

BACKGROUND OF THE INVENTION

1. Field of the Invention

The present invention relates to an antenna selecting diversity receiving apparatus suitable for use in a radio communication system of a time-division multiplex (hereinafter called "TDM") type using a linear modulating wave.

2. Description of the Related Art

FIG. 1 is a block diagram showing a control circuit employed in an antenna selecting diversity receiving apparatus which is disclosed, for example, in U.S. patent application Ser. No. 126,548 filed Nov. 30, 1987. In the same drawing, numeral 1 is a sample-and-hold circuit used to sample received electric field signals represented in the form of electric-field levels received by respective antennas, (hereinafter called "RSSI") which signals are delivered from an unillustrated radio receiver, and then to hold the sampled level therein.

Numeral 2 is a comparing circuit for comparing the level of one of RSSI signals sampled and held by the sample-and-hold circuit and the level of one of RSSI signals from the radio receiver. In addition, numeral 3 is an antenna switch control circuit comprised of first to third exclusive OR gates 4 through 6 and a D flip-flop 7 for controlling an unillustrated antenna switching circuit based on the result of comparison by the comparing circuit 2 to thereby select an antenna which brings the electric fields into a most-satisfactorily receivable state.

The operation of the control circuit will next be described.

Since land mobile radio communications normally occur over line-of-sight paths between radio mobile stations, and radio waves arrive after they are scattered, diffracted and reflected through a medium, the propagation path thereof is defined in the form of a multiwave propagation path. Thus, a distribution of electromagnetic fields having random standing-wave characteristics is formed by the interference of the multiwaves, and fading is produced because a mobile station runs under the distribution of the electromagnetic fields. As a consequence, the level of electric fields received by one antenna mounted on the mobile station is varied as shown in FIG. 2.

Therefore, there has normally been adopted, in the above-described mobile radio communications, an antenna selecting diversity system of the type wherein a plurality of antennas are prepared so as to select one of the antennas, which can bring electric fields into a most-satisfactorily receivable state at that time. If the driving speed of the mobile station is set to 100 Km/h, the fading frequency at the time of occurrence of fading is on the order of 80 Hz at the band of 900 MHz.

A description will hereinafter be made of the antenna selecting diversity circuit employed in the apparatus shown in FIG. 1. FIG. 3 is a timing chart for describing its operation. Assuming that two time slots, i.e., "A" and "B" are defined in the mobile radio communication system and the time slot "A" out of them is allotted to a corresponding radio receiver as shown in FIG. 3.

First of all, electric-field levels received by two antennas are monitored during a period of the time slot B immediately before the time slot A allotted to the radio receiver. A RSSI signal received by one of the two antennas, which is first detected by the radio receiver, is input to the sample-and-hold circuit 1 so as to be sampled and held therein and to be supplied to an inverting input terminal of the comparing circuit 2. On the other hand, an output signal of the sample-and-hold circuit 1 is input to a non-inverting input terminal of the comparing circuit 2. Thus, if a RSSI signal received by the other of the two is input to the radio receiver, then the comparing circuit 2 compares the corresponding RSSI signal with the RSSI signal which has been sampled and held in the sample-and-hold circuit 1 to thereby supply the result of its comparison to the antenna switching control circuit 3.

The result of its comparison is input to one of the input terminals of a first exclusive OR gate 4 in the antenna switching control circuit 3. A $\bar{Q}$ output of the D flip-flop 7 whose data port is supplied with the output of the exclusive OR gate 4 is input to the other of the input terminals of the exclusive OR gate 4. In addition, a sample-and-hold signal is input to one of the input terminals of a second exclusive OR gate 5, and the other of the input terminals is set to be a high level (+5 V). Thus, the sample-and-hold signal is inverted by the second exclusive OR gate 5.

The sample-and-hold signal is also input to a clock terminal of the D flip-flop 7. A Q output of the D flip-flop 7 is supplied to one of the input terminals of a third exclusive OR gate 6. In addition, the output of the second exclusive OR gate 5 is supplied to the other of the input terminals of the exclusive OR gate 6. Thus, their exclusive OR is output from the antenna switching control circuit 3 as an antenna switch output.

Accordingly, an antenna switch output signal is newly output based on the result of comparison between the RSSI signals received by the two antennas immediately before the start point of the time slot A, and the antenna switch output at that time, so that an antenna capable of receiving a RSSI signal of a higher level is selected.

FIG. 4 is a diagram for describing the transition of a carrier subjected to minimum phase-shift modulation (hereinafter called "MSK") on a vector plane. The phase only in the carrier on the vector plane is varied and its magnitude is constant in the MSK system as shown in the drawing. Thus, if a comparison is made between RSSI signals received instantly by the two antennas immediately before the start point of the allotted time slot, the selection of an antenna, which can bring electric fields into a most-satisfactorily receivable state, can be realized with high possibility during the period of the allotted time slot.

The antenna selecting diversity system referred to above is normally effective for use in a modulation system with a constant envelope included therein as in the case of phase and frequency modulation systems.

The conventional antenna selecting diversity receiving apparatus is constructed as described above. Therefore, this apparatus is effective in a time-division radio communication system using a modulation method with the constant envelope. However, this apparatus is accompanied by the problem that it cannot be applied to a time-division radio communication system based on a linear modulation scheme using a linear modulating wave wherein the components or the envelope of the signal are also varied as well as a variation in its phase, as in the case of two-phase phase-shift modulation (hereinafter called "BPSK") system, quadruple-phase modulation (hereinafter called "QPSK") system and a 16-value quadrature amplitude modulation (hereinafter called "16 QAM") system, or the like.

SUMMARY OF THE INVENTION

With the foregoing problem in view, it is an object of the present invention to provide an antenna selecting diversity receiving apparatus effective even in a time-division radio communication system using a linear modulating wave.

According to one aspect of the present invention, there is provided an antenna selecting diversity receiving apparatus which comprises an integrating circuit for integrating electric-field levels received by respective antennas, which are detected immediately before a start point of an allotted time slot for a predetermined period of time; a comparing circuit for making a comparison among respective time-integrated values of the integrating circuit for every antenna; and a changeover control circuit for selecting an antenna which brings electric fields into a most-satisfactorily receivable state based on the result of comparison by the comparing circuit to thereby control an antenna switching circuit.

The integrating circuit integrates the electric-field levels received by the respective antennas, which are detected immediately before the start point of the allotted time slot for the predetermined period of time, thereby averaging variations in the envelope of modulated data. The changeover control circuit controls the antenna switching circuit based on the result of comparison of the time-integrated values from the integrating circuit so as to select the intended antenna which brings the electric fields into the most-satisfactorily receivable state. As a consequence, the antenna selecting diversity receiving apparatus effective even in a system using a linear modulating wave can be realized.

According to another aspect of the present invention, there is provided an antenna selecting diversity receiving apparatus which comprises an integrating circuit for integrating electric-field levels received by respective antennas, which are detected for a plurality of times alternately before a start point of an allotted time slot, for a predetermined period of time; a prediction circuit for predicting variations in the electric-field levels received by the respective antennas during the period of the allotted time slot, based on the time-integrated values of the integrating circuit corresponding to the respective antennas; and a changeover control circuit for selecting a desired antenna which brings electric fields into a most-satisfactorily receivable state based on the result of prediction by the prediction circuit so as to control an antenna switching circuit.

The prediction circuit predicts the variations in the electric-field levels received by the individual antennas during the period of the allotted time slot, based on the time-integrated values corresponding to the electric-field levels received by the respective antennas, which are detected for a plurality of times alternately immediately before the start point of the allotted time slot. The changeover control circuit controls the antenna switching circuit based on the result of the prediction circuit so as to select the desired antenna which brings the electric fields into the most-satisfactorily receivable state. As a consequence, the antenna selecting diversity receiving apparatus effective even in a system using a linear modulating wave can be realized.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Preferred embodiments of the present invention will hereinafter be described with reference to the accompanying drawings.

Figure 1:
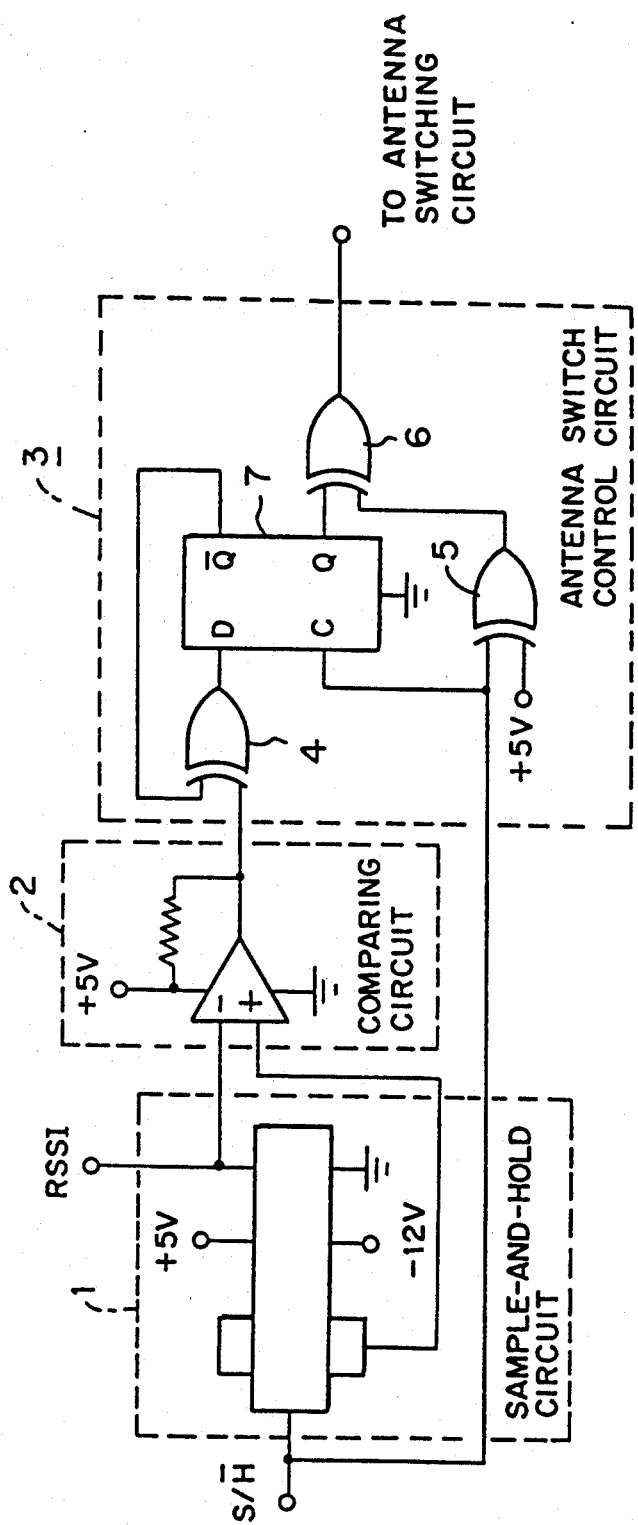
FIG. 1 is a block diagram showing a control circuit employed in a conventional antenna selecting diversity receiving apparatus.
Figure 3:
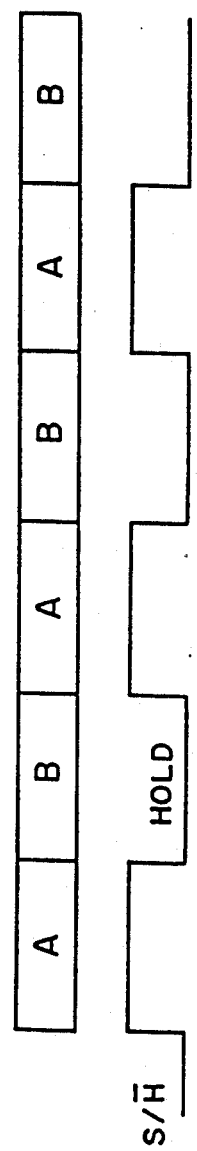
FIG. 3 is a timing chart for describing the operation of the conventional antenna selecting diversity receiving apparatus.
Figure 2:
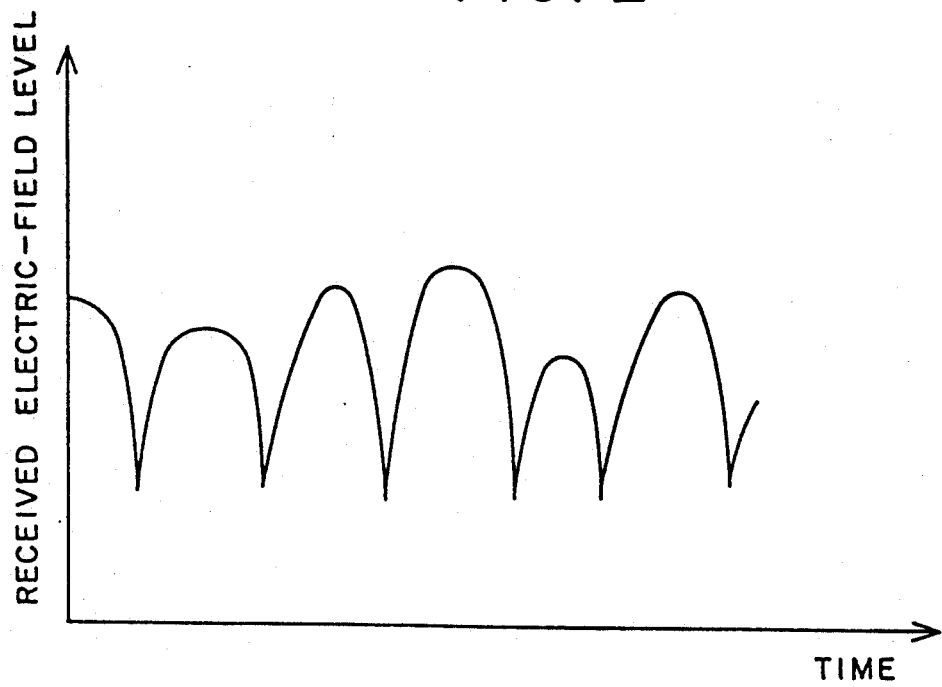
FIG. 2 is a diagram for describing variations in the level of electric fields received by an antenna mounted on a mobile station which runs under the distribution of electromagnetic fields with fading produced therein.
Figure 4:
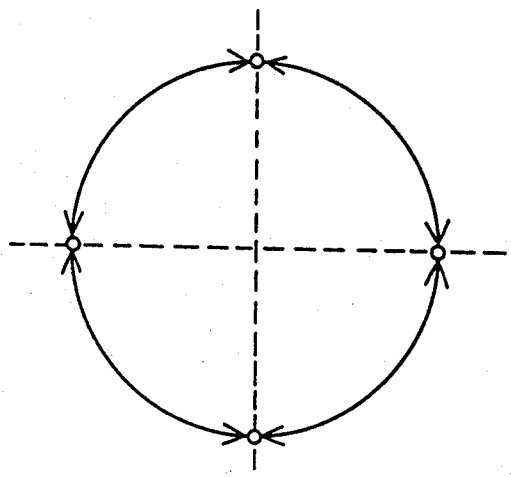
FIG. 4 is a diagram for describing the transition of a carrier subjected to MSK on a vector plane.
Figure 5:
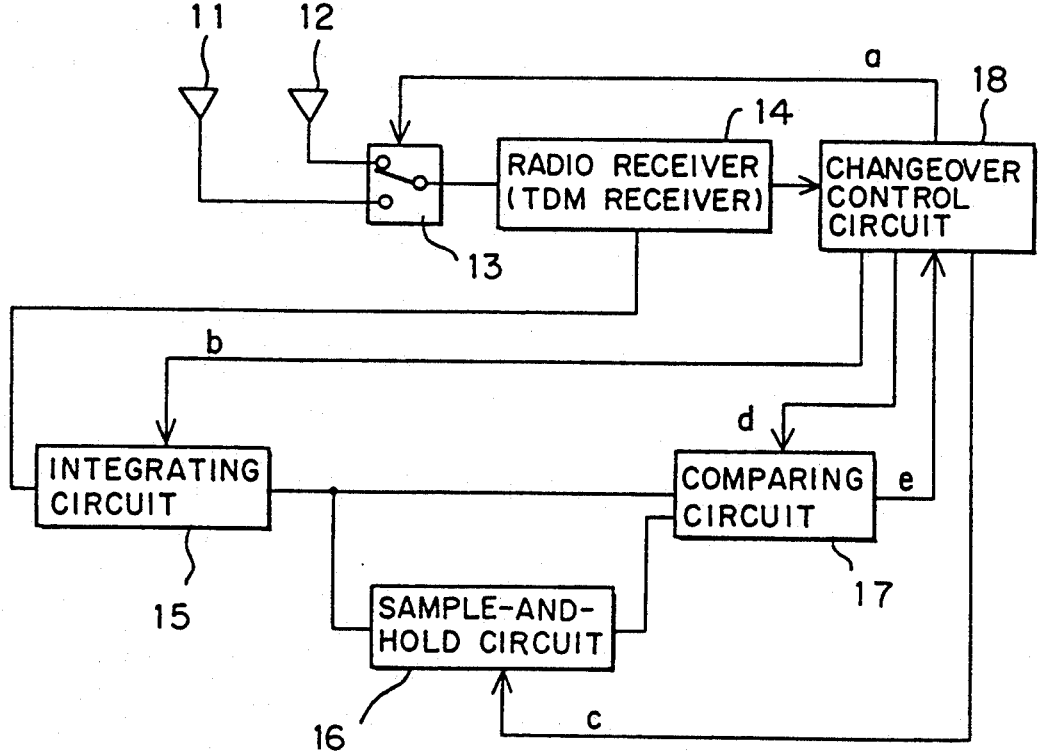
FIG. 5 is a block diagram showing an antenna selecting diversity receiving apparatus according to one embodiment of the present invention.

FIG. 5 is a block diagram showing an antenna selecting diversity receiving apparatus according to one embodiment of the present invention. In the same drawing, numerals 11 and 12 are antennas which are provided separately from each other. Designated at numeral 13 is an antenna switching circuit for selectively connecting one of antennas 11 and 12 to the remainder of the circuit. Numeral 14 indicates a TDM receiver as a radio receiver of a corresponding radio communication system. Numeral 15 is an integrating circuit which serves to integrate, for a predetermined period of time, RSSI signals detected by the TDM receiver through the respective antennas 11, 12 immediately before a start point of a time slot allotted to the TDM receiver 14.

Numeral 16 is a sample-and-hold circuit for sampling time-integrated values from the integrating circuit 15 and then holding the same therein. Numeral 17 indicates a comparing circuit for comparing the previous time-integrated value held by the sample-and-hold circuit 16 and the present time-integrated value supplied from the integrating circuit 15. In addition, numeral 18 is a change-over control circuit for selecting one of the antennas 11, 12, which can bring electric fields into a most-satisfactorily receivable state, based on the result of comparison by the comparing circuit 17 so as to control the antenna switching circuit 13 and for supplying a timing signal to the integrating circuit 15, the sample-and-hold circuit 16 and the comparing circuit 17.

Next, the operation of the apparatus will now be described.

Figure 6:
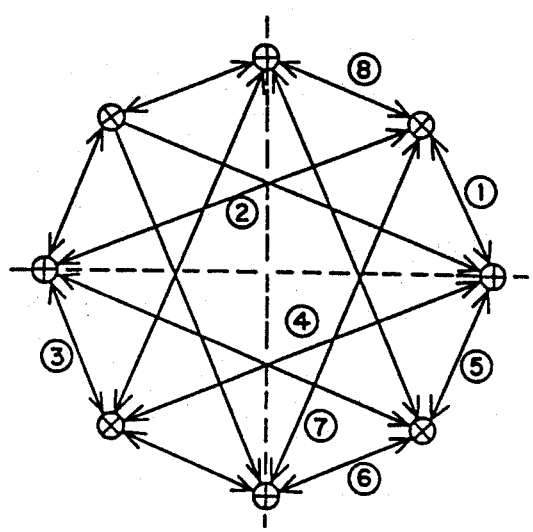
FIG. 6 is a diagram for describing the transition of a carrier subjected to $\pi/4$ shift QPSK on an amplitude and phase plane.
Figure 7:
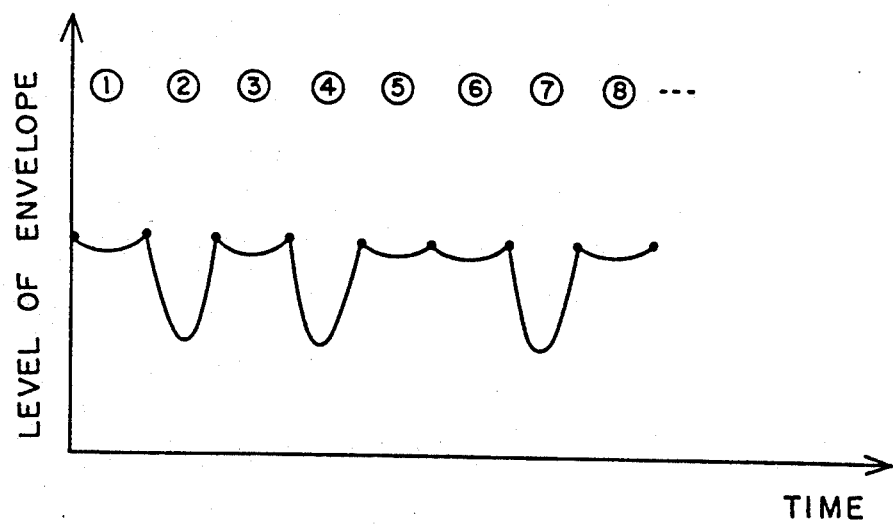
FIG. 7 is a diagram for explaining variations in the envelope of the carrier subjected to the $\pi/4$ shift QPSK.

A description will now be made of variations in the amplitude of the linear-modulation envelope. FIG. 6 is a diagram describing the transition of a carrier on an amplitude and phase plane in the modulation system referred to as "π/4 shift QPSK". As shown in FIG. 6, the amplitude and phase of the carrier vary corresponding to data to be transmitted. FIG. 7 is a diagram illustrating only variations in the level of the envelope referred to above. Since the level of the envelope varies significantly as shown in the drawing, it has little valuable meaning if only an instant RSSI signal is sampled and held.

As data transfer speeds, several tens of Kbps to several hundreds of Kbps are normally used. They are sufficiently large values as compared with a fading frequency, i.e., about 80 Hz described previously.

Figure 8:
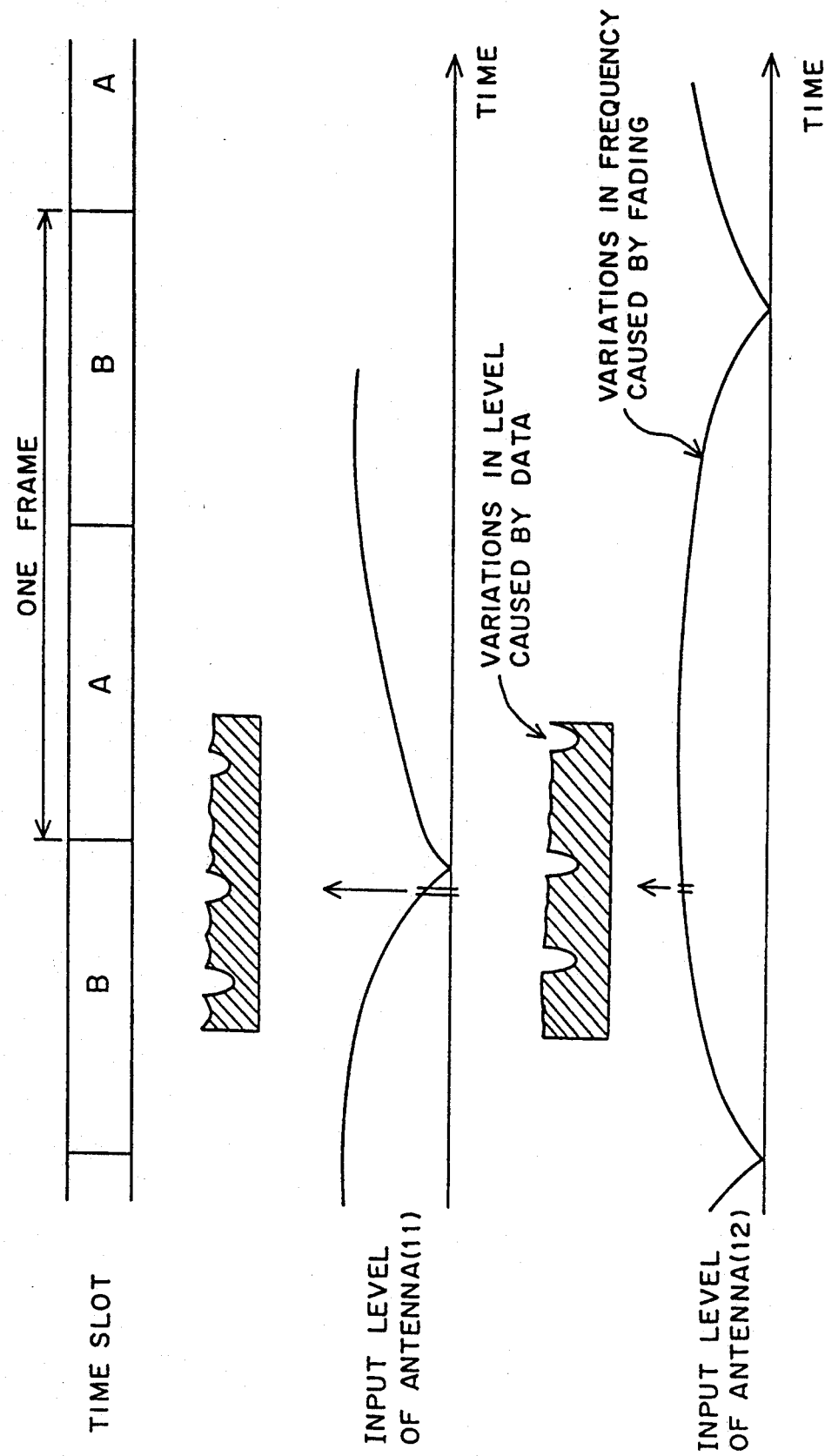
FIG. 8 is a diagram for describing one example illustrative of the relationship between receiving time slots and input levels of respective antennas on a time base.

FIG. 8 is a diagram for describing one example illustrative of the relationship between receiving time slots and input levels of the antennas 11, 12 on a time base. As shown in the drawing, the input levels of the antennas 11, 12 include variations in frequencies up to 80 Hz or so caused by fading, and variations in the level due to modulated data. It is therefore necessary to detect only variations in the input levels of the antennas 11, 12 caused by the fading after the variations in the level caused by the modulated data have been eliminated, in order to select either the antenna 11 or 12 which falls into a higher electric-field level state. For this purpose, the level of the RSSI signals detected by the TDM receiver 14 through the respective antennas 11 and 12 during a period of a time slot immediately before the time slot allotted to the receiver 14 is integrated for a period of time, and the variations in the level due to the modulated data are averaged after which a comparison is made between the result of their integration and the result of their average.

Figure 9:
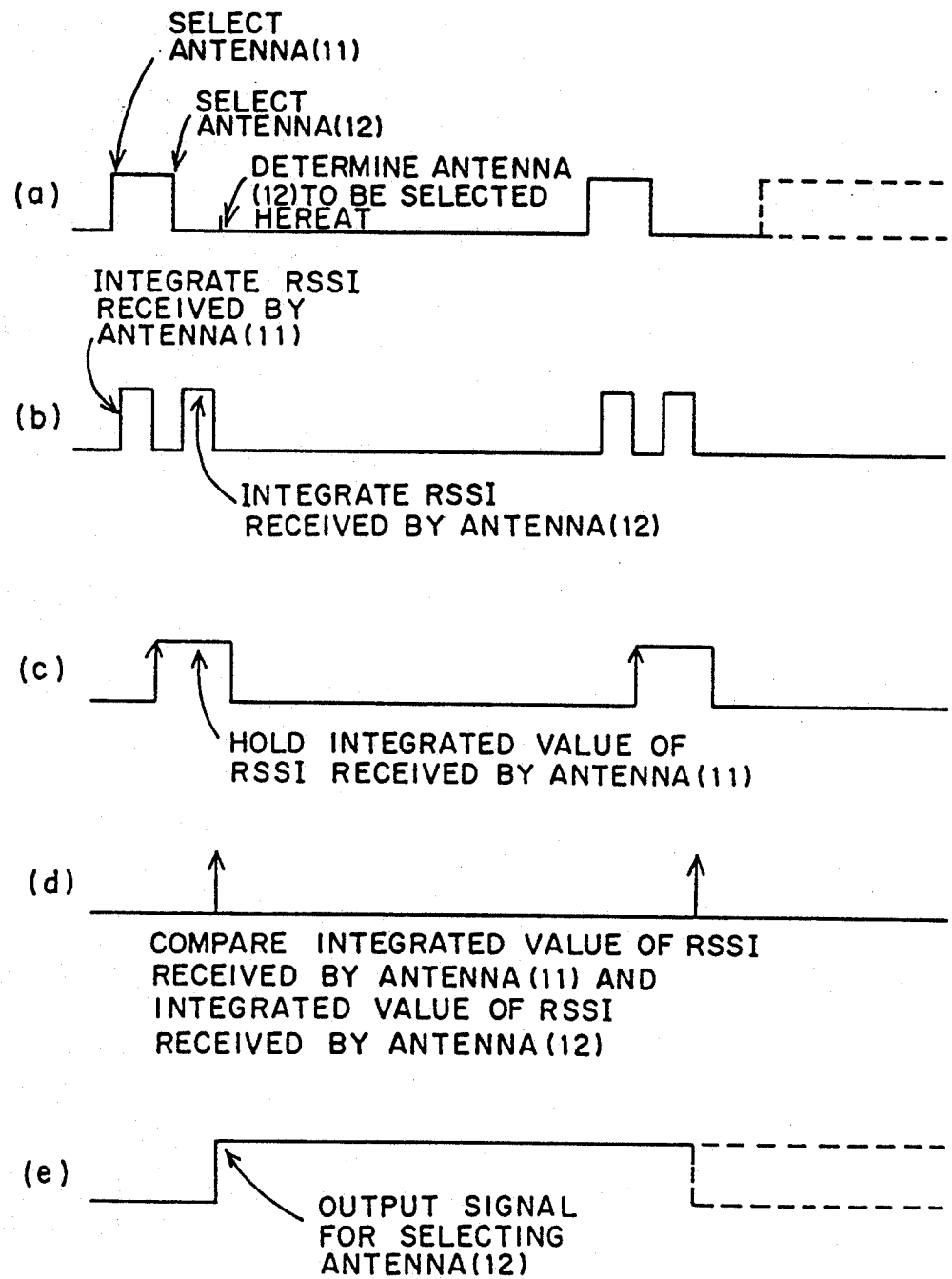
FIG. 9 is a timing chart for describing the operation of the antenna selecting diversity receiving apparatus shown in FIG. 5.

Next, the operation of the embodiment shown in FIG. 5 will hereinafter be described in detail. Here, FIG. 9 is a timing chart for describing its operation, in which FIG. 9(a) shows a control signal supplied from the changeover control circuit 18 to the antenna switching circuit 13, FIG. 9(b) depict a timing signal supplied from the changeover control circuit 18 to the integrating circuit 15, FIG. 9(c) illustrates a timing signal supplied from the changeover control circuit 18 to the sample-and-hold circuit 16 in the same manner as described above, FIG. 9(d) similarly shows a timing signal supplied therefrom to the comparing circuit 17, and FIG. 9(e) shows the result of comparison by the comparing circuit 17 supplied to the changeover circuit 18. Let's also assume that even in this case, time slot A is allotted to the TDM receiver in the same manner as that in the conventional example.

First of all, the changeover control circuit 18 produces a control signal required for the antenna switching circuit 13 to select the antenna 11 immediately before a start point of one of the time slots A. Then, the antenna switching circuit 13 connects the antenna 11 to the TDM receiver 14 in response to the control signal. The TDM receiver 14 monitors a RSSI signal through the antenna 11 and then delivers the same to the integrating circuit 15. Thereafter, the changeover control circuit 18 supplies a timing signal to the integrating circuit 15 so as to integrate the RSSI signal received by the antenna 11 only for a predetermined period of time Then, the changeover control circuit 18 supplies a timing signal to the sample-and-hold circuit 16, where the time-integrated value of the RSSI signal received by the antenna 11, which is integrated in the integrating circuit 15, is sampled and held therein.

Then, the changeover control circuit 18 supplies a control signal required for the antenna switching circuit 13 to select the antenna 12. The antenna switching circuit 13 connects the antenna 12 to the TDM receiver 14 in response to the control signal and delivers a RSSI signal received by the antenna 12 to the integrating circuit 15. Thereafter, the changeover control circuit 18 supplies the timing signal to the integrating circuit 15 again so as to integrate the RSSI signal received by the antenna 12 for the predetermined period of time.

Then, the comparing circuit 17 receives therein the time-integrated value of the RSSI signal received by the antenna 12 and the time-integrated value of the RSSI signal received by the antenna 11, which has been sampled and held in the sample-and-hold circuit 16. When the comparing circuit 17 receives a timing signal used for a comparison start command from the changeover control circuit 18, it compares both time-integrated values referred to above so as to output the result of their comparison to the changeover control circuit 18. The changeover control circuit 18 serves to select one (the antenna 12 in the illustrated example) of the antennas 11, 12, which brings an electric field into a more satisfactorily receivable state, based on the result of comparison referred to above, and then to supply a control signal for connecting the so-selected antenna to the TDM receiver 14, to the antenna switching circuit 13.

Incidentally, the above-described embodiment has shown and described the TDM receiver which monitors the RSSI signal received by each of the antennas only immediately before the start point of the allotted time slot. However, a RSSI signal received by one of antennas selected during a period of a further allotted time slot may be integrated repeatedly so as to be switched to the other antenna when its integrated value is below a predetermined value.

Figure 10:
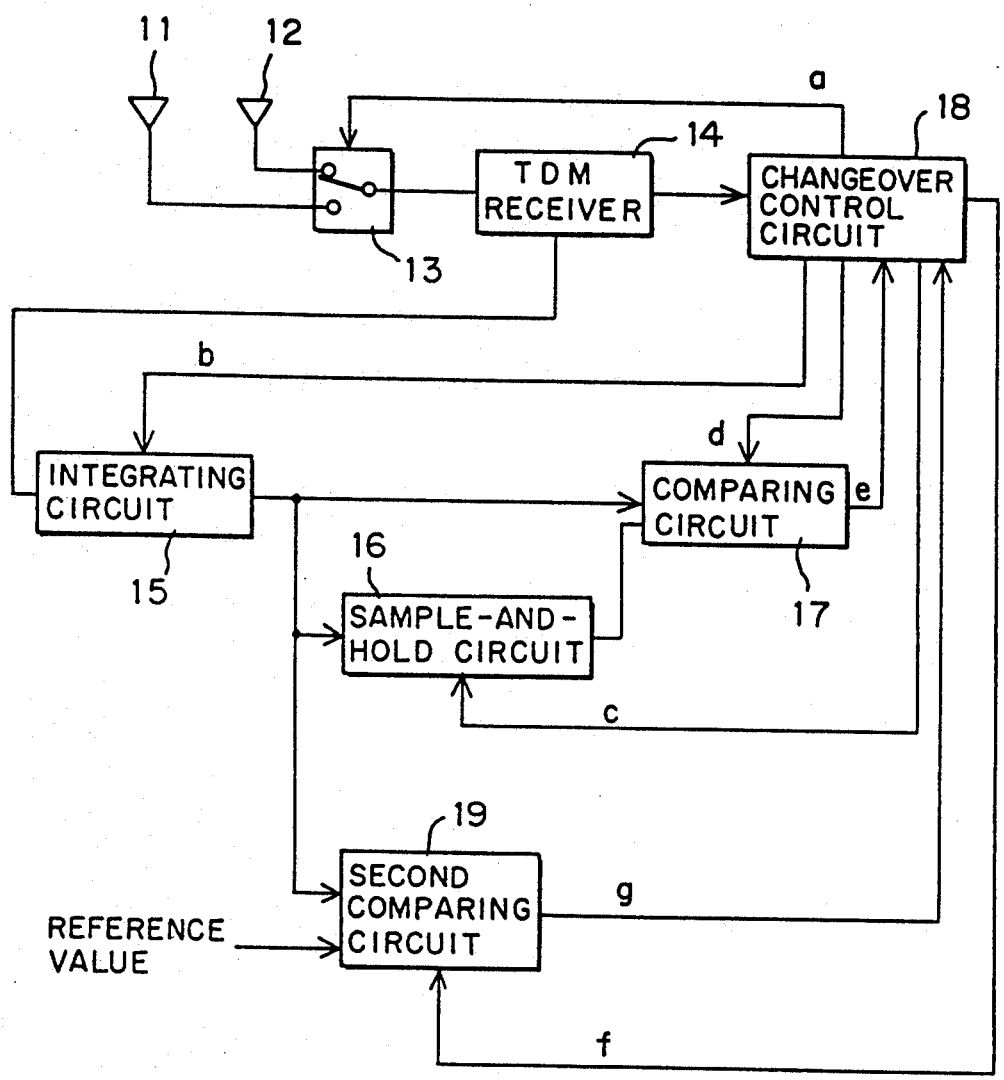
FIG. 10 is a block diagram showing an antenna selecting diversity receiving apparatus according to another embodiment of the present invention.
Figure 11:
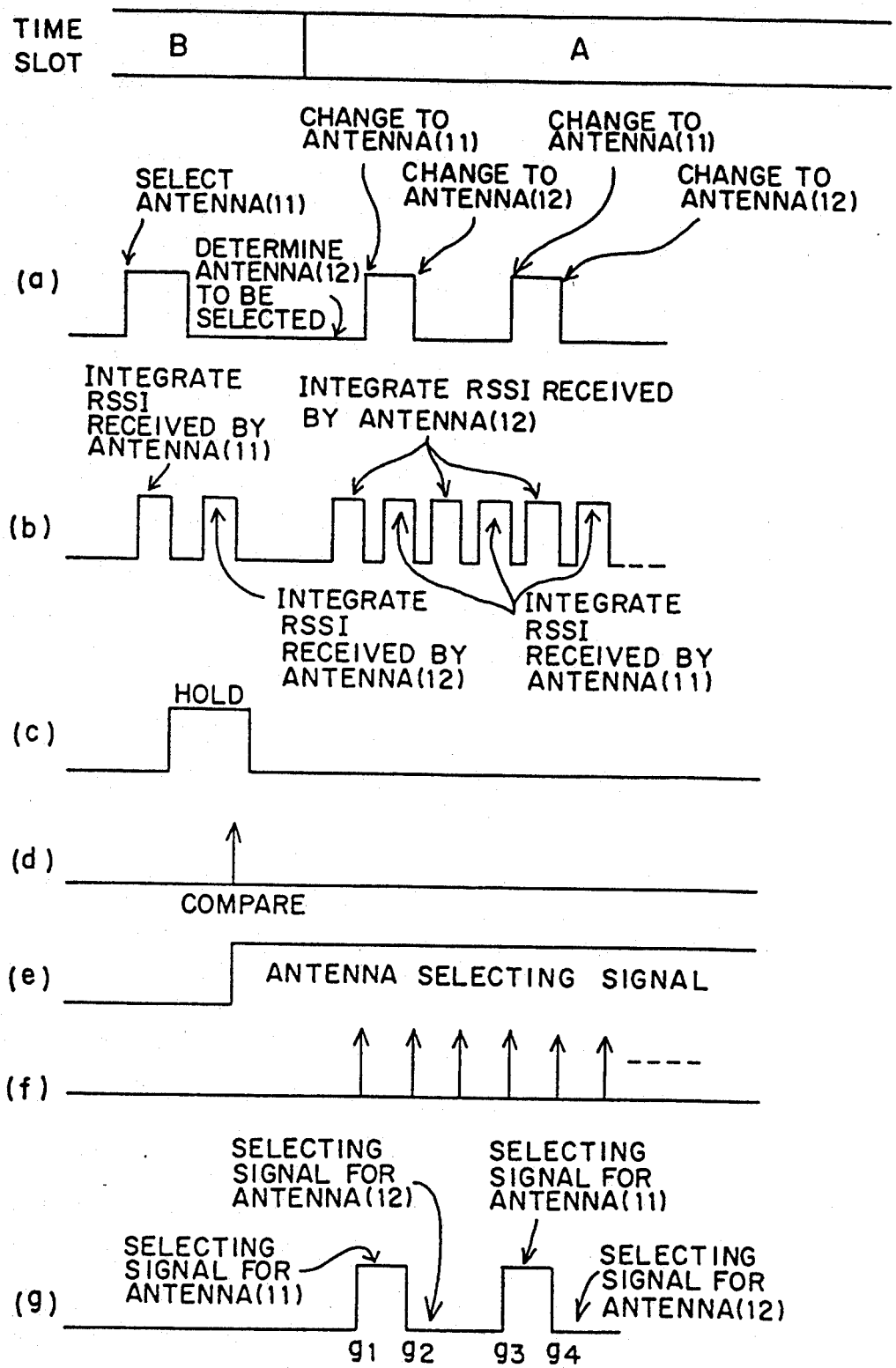
FIG. 11 is a timing chart for describing the operation of the antenna selecting diversity receiving apparatus depicted in FIG. 10.

FIG. 10 is a block diagram showing such an embodiment as referred to above. FIG. 11 is a timing chart for describing the operation of the embodiment shown in FIG. 10. The same or similar elements of structure as those in the embodiment shown in FIG. 5 are identified by like reference numerals and the description of certain common elements will therefore be omitted. Referring to FIG. 10, numeral 19 is a second comparing circuit for comparing a time-integrated value from the integrating circuit 15 and a preset reference value in accordance with a timing signal delivered from the changeover control circuit 18 so as to output the result thus compared to the changeover control circuit 18.

As shown in FIG. 11(b), the changeover control circuit 18 supplies a timing signal to direct that the integration be performed periodically, to the integrating circuit 15 even during a period of an allotted time slot A. In addition, the comparing circuit 17 and the second comparing circuit 19 each receive therein a time-integrated value of the RSSI signal received by one of the antennas 11 and 12. Then, the changeover control circuit 18 supplies a timing signal shown in FIG. 11(f) only to the second comparing circuit 19 during the period of the time slot A. The second comparing circuit 19 compares a time-integrated value, accepted in response to the timing signal, with the reference value.

Then, the second comparing circuit 19 delivers the result of its comparison to the changeover control circuit 18 as the compared result shown in FIG. 11(g). When the time-integrated value of the RSSI signal received by one of the antennas 11 and 12, which is now selected, is below the reference value, the changeover control circuit 18 supplies a control signal shown in FIG. 11(a) to the antenna switching circuit 13 based on the compared result depicted in FIG. 11(g), thereby switching the present antenna to the other of the antennas 11, 12.

In the example illustrated in FIG. 11(g), since the time-integrated value of the RSSI signal received by the antenna 12 is smaller than the reference value in each timing $g_1$, $g_3$, the second comparing circuit 19 outputs a signal indicative of its contents to the changeover control circuit 18. Then, the changeover control circuit 18 supplies a control signal for selecting the antenna 11 to the antenna switching circuit 13 in response to the signal delivered from the second comparing circuit 19. Thus, the antenna switching circuit 13 is selectively activated in such a manner that the antenna 11 is electrically connected to the TDM receiver 14 in each timing $g_1$, $g_3$. In addition, since the time-integrated value of the RSSI signal received by the antenna 11 is smaller than the reference value, the antenna switching circuit 13 is selectively activated in such a way that the antenna 12 is electrically connected to the TDM receiver 14 in each timing $g_1$, $g_3$.

As described above, the level of the electric fields, which are received by the respective antennas immediately before the start point of the allotted time slot, is integrated for the predetermined period of time to thereby select the antenna capable of bringing the electric field into the most satisfactorily receivable state based on the result of comparison of the values obtained by the time-integration. Therefore, the variations in the envelope of the modulated data are averaged, and an antenna selecting diversity receiving apparatus can be achieved that is effective even in the time-division radio communication system using the linear modulating wave.

Figure 12:
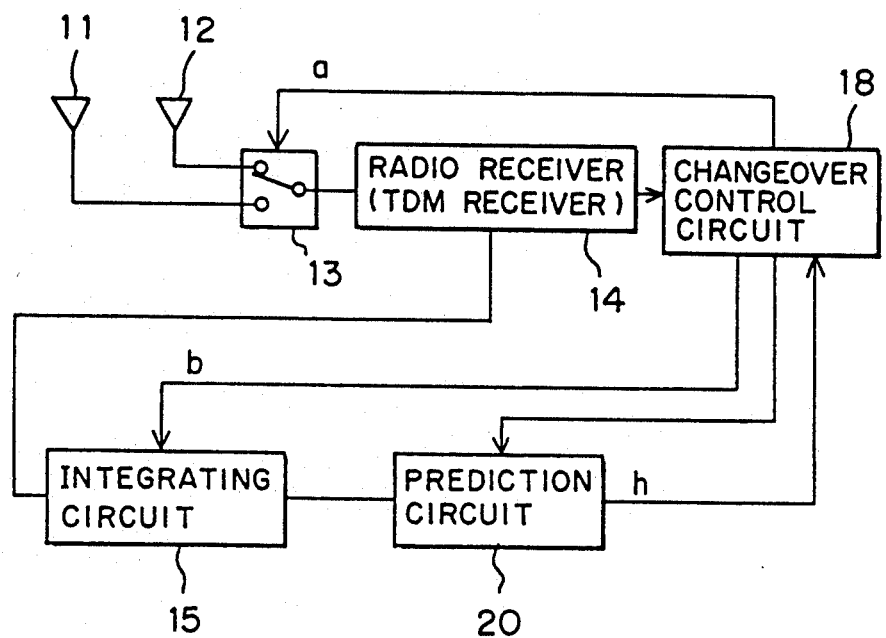
FIG. 12 is a block diagram showing an antenna selecting diversity receiving apparatus according to a further embodiment of the present invention.

FIG. 12 is a block diagram showing an antenna selecting diversity receiving apparatus according to a further embodiment of the present invention. The same or similar elements of structure as those shown in FIG. 5 are identified by like reference numerals for the purpose of avoiding the description of the certain common elements. In FIG. 12, numeral 20 is a prediction circuit for predicting variations in the level of electric fields received by the respective antennas 11, 12 during a period of an allotted time slot, based on respective time-integrated values corresponding to RSSI signals received by the antennas 11 and 12, which are detected for a plurality of times alternately and time-integrated by the integrating circuit 15, thereby outputting the result of their prediction to the changeover control circuit 18.

Next, the operation of the present embodiment will now be described. Here, FIG. 13 is a timing chart for describing its operation.

The changeover control circuit 18 supplies a control signal shown in FIG. 13(a) to the antenna switching circuit 13. The changeover control circuit 18 monitors both RSSI signals received at the respective antennas 11 and 12 for a plurality of times while switching the antennas 11 and 12 alternately, during a period of a time slot B, and supplies the result thus monitored to the integrating circuit 15 successively. The integrating circuit 15 serves to integrate the received RSSI signals for a predetermined period of time in accordance with a timing signal shown in FIG. 13(b) and delivered from the changeover control circuit 18, and to output the thus time-integrated values to the prediction circuit 20.

The prediction circuit 20 compares a series of time-integrated values with respect to the antenna 11 supplied from the integrating circuit 15 and a series of time-integrated values with respect to the antenna 12 delivered therefrom, as shown in FIG. 13(h). Then, the prediction circuit 20 predicts RSSI signals to be received by the respective antennas 11, 12 during a period of a time slot A, and supplies the result of their prediction to the changeover control circuit 18. The changeover control circuit 18 selects either the antenna 11 or 12 capable of bringing the electric field into a satisfactorily receivable state, based on the result of prediction received, and controls the antenna switching circuit 13, thereby connecting either the antenna 11 or 12 to the TDM receiver 14.

Figure 13:
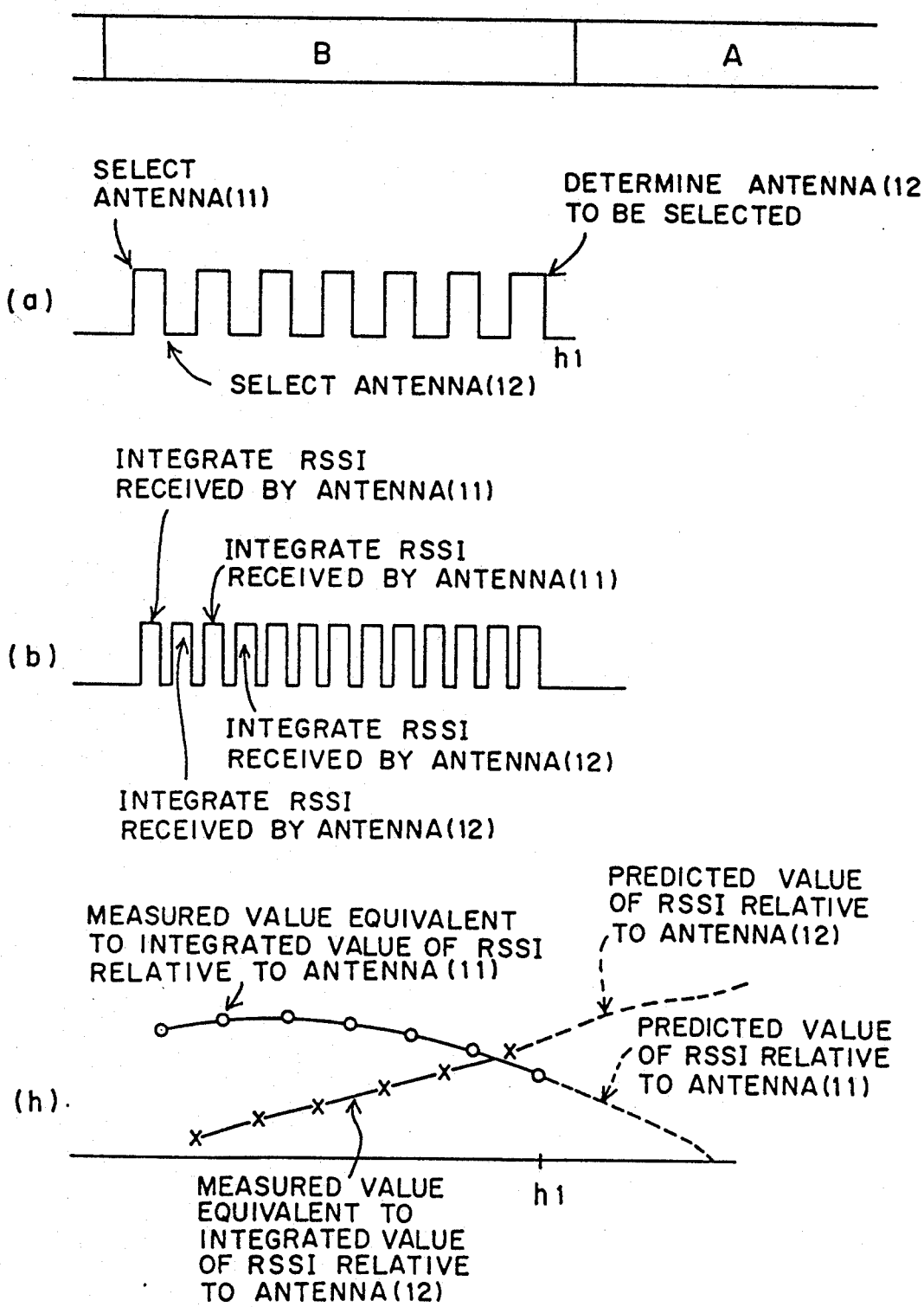
FIG. 13 is a timing chart for illustrating the operation of the antenna selecting diversity receiving apparatus shown in FIG. 12.

In the example illustrated in FIG. 13(h), a comparison is made between the inclination of the series of the integrated values relative to the antenna 11 and the inclination of the series of the integrated values relative to the antenna 12 during the period of the time slot B. Then, a prediction is made as to whether the integrated value of the RSSI signal relative to the antenna 11 is greater than that of the RSSI signal relative to the antenna 12 or vice versa at a predetermined point (at a start point of the time slot A, for example) of the time slot A. Since it is predicted in the example illustrated in FIG. 13(h) that the integrated value of the RSSI signal received at the antenna 12 is greater than that thereof received at the antenna 11 at the start point of the time slot A, the prediction circuit 20 supplies its information to the changeover control circuit 18. As a consequence, the changeover control circuit 18 supplies a control signal for definitely selecting the antenna 12 at the timing $h_1$ shown in FIG. 13 to the antenna switching circuit 13 at the start point of the time slot A or before the start point thereof. Accordingly, the antenna switching circuit 13 is selectively activated in such a manner that the antenna 12 is electrically connected to the TDM receiver 14 at the timing $h_1$.

As has been described above, the variations in the level of the electric fields received by the respective antennas during the period of the allotted time slot are predicted based on the time-integrated values corresponding to the level of the electric fields received by the respective antennas, which is detected for every plural times alternatively, immediately before the start point of the allotted time slot, and the antenna, which makes it most satisfactory to receive the electric fields, is selected based on the result of their prediction. Therefore, an antenna selecting diversity receiving apparatus can be achieved that is effective even in the time-division radio communication system using the linear modulating wave.

Having now fully described the invention, it will be apparent to those skilled in the art that many changes and modifications can be made without departing from the spirit or scope of the invention as set forth herein.

What is claimed is:

1. An antenna selecting diversity receiving apparatus for use in a time-division multiplexing radio communication system which uses a linear modulating wave, for selecting one of a plurality of antennas which receives a strongest electric field, and to connect the antenna thus selected to a radio receiver through an antenna switching circuit, said apparatus comprising:
   an integrating circuit for respectively integrating electric field levels received by each of said plurality of antennas before a start point of a time slot allotted to said radio receiver, for a predetermined period of time and for outputting the time-integrated electric field level values therefrom;
   a comparing circuit for making a comparison among the respective time-integrated values form said integrating circuit, corresponding to each of said plurality of antennas; and
   a changeover control circuit for selecting an antenna corresponding to the maximum time-integrated value based on the result of comparison by said comparing circuit by controlling said antenna switching circuit to connect the antenna thus selected to said radio receiver during a period of said allotted time slot.

2. An antenna selecting diversity receiving apparatus according to claim 1, wherein said changeover control circuit supplies a control signal to said antenna switching circuit for successively connecting the respective antennas to said radio receiver such that said radio receiver outputs the electric field levels received by the respective antennas before the start point to the time slot allotted to said radio receiver.

3. An antenna selecting diversity receiving apparatus according to claim 2, further comprising a sample-and-hold circuit provided between said integrating circuit and said comparing circuit to sample a time-integrated value corresponding to an electric-field level received by a first antenna and to hold the sampled value therein.

4. An antenna selecting diversity receiving a apparatus according to claim 3, wherein said changeover control circuit supplies a control signal to said antenna switching circuit for connecting said first antenna to said radio receiver such tat said radio receiver outputs the electric field strength level received by said first antenna during a period of a time slot before the allotted time slot, and to supply a signal for causing said integrating circuit to start integrating, said changeover control circuit further supplying a signal to said sample-and-hold circuit for sampling and holding the time-integrated values of said integrating circuit, supplying a control signal to said antenna switching circuit for connecting a second antenna to said radio receiver such that said radio receiver outputs the electric field strength level received by said second antenna, and supplying a signal to sad comparing circuit for comparing one of the time-integrated values with one of the values held in said sample-and-hold circuit.

5. An antenna selecting diversity receiving apparatus according to claim 4, further comprising a second comparing circuit for comparing one of the time-integrated values of said integrating circuit and a reference value and supplying the compared result representing the magnitude of said one time-integrated value and said reference value to said changeover control circuit.

6. An antenna selecting diversity receiving apparatus according to claim 5, wherein said changeover control circuit supplies a signal for causing said integrating circuit to start integration and thereafter supplies a signal to said second comparing circuit for comparing said one time-integrated value with said reference value during the period of the time slot alotted to said radio receiver, said changeover control circuit being further adapted to supply a control signal for directing the changeover of the antenna to said antenna switching circuit when said changeover control circuit receives the result of comparison representing that said one time-integrated value is smaller than said reference value.

7. An antenna selecting diversity receiving apparatus for use ia time-division multiplexing radio communication system which uses a linear modulating wave, for selecting on of a plurality of antennas which receives a strongest electric field, and to connect the antenna thus selected to a radio receiver through an antenna switching circuit, said apparatus comprising:
   an integrating circuit for respectively integrating electric field levels received by each of said plurality of antennas before a start point of a time slot allotted to said radio receiver, for a predetermined period of time and for outputting the time-integrated electric field level values therefrom;
   a prediction circuit for predicting variations int he electric field levels received by each of said plurality of antennas during the period of the time slot allotted to said radio receiver, based on the time-integrated values supplied form said integrating circuit before the allotted time slot period of said radio receiver; and
   a changeover control circuit for selecting an antenna which receives the strongest electric field bas con the result of prediction by said prediction circuit by controlling said antenna switching circuit such that the antenna thus selected is electrically connected to said radio receiver.

8. An antenna selecting diversity receiving apparatus according to claim 7, further comprising first and second antennas.

9. An antenna selecting diversity receiving apparatus according to claim 8, wherein said prediction circuit compares the inclination of a series of time-integrated values relative to said first antenna and the inclination of a series of time-integrated values relative to said second antenna to thereby predict whether one of the time-integrated values relative to said first antenna is greater than one of the time-integrated values relative to said second antenna or vice versa at the start point of the time slot allotted to said radio receiver, based on the result of its comparison.

* * * * *

UNITED STATES PATENT AND TRADEMARK OFFICE
CERTIFICATE OF CORRECTION

PATENT NO. : 5,241,701
DATED : August 31, 1993
INVENTOR(S) : A. Andoh

It is certified that error appears in the above-identified patent and that said Letters Patent is hereby corrected as shown below:

Col. 1, line 16, "126,548" should be --126,548,--.

Col. 2, line 65, "or" should be --of--.

Col. 9, line 24, "form" should be --from--.

Col. 9, line 52, "tat" should be --that--.

Col. 9, line 64, "sad" should be --said--.

Col. 10, line 24, "ia" should be --in a--.

Col. 10, line 36, "int he" should be --in the--.

Col. 10, line 41, "form" should be --from--.

Col. 10, line 45, "bas con" should be --based on--.

Signed and Sealed this

Twelfth Day of April, 1994

Attest:

BRUCE LEHMAN

*Attesting Officer*   *Commissioner of Patents and Trademarks*